(12) United States Patent
Golsch

(10) Patent No.: US 10,838,052 B2
(45) Date of Patent: Nov. 17, 2020

(54) LOCALIZATION SYSTEMS AND METHODS USING COMMUNICATION PROTOCOLS WITH OPEN CHANNELS AND SECURE COMMUNICATION CONNECTIONS

(71) Applicants: DENSO International America, Inc., Southfield, MI (US); DENSO CORPORATION, Kariya (JP)

(72) Inventor: Kyle Golsch, Pontiac, MI (US)

(73) Assignees: DENSO International America, Inc., Southfield, MI (US); DENSO CORPORATION, Kariya (JP)

( * ) Notice: Subject to any disclaimer, the term of this patent is extended or adjusted under 35 U.S.C. 154(b) by 0 days.

(21) Appl. No.: 16/871,209

(22) Filed: May 11, 2020

(65) Prior Publication Data

US 2020/0271770 A1    Aug. 27, 2020

Related U.S. Application Data

(63) Continuation of application No. 16/123,052, filed on Sep. 6, 2018, now Pat. No. 10,663,569.

(Continued)

(51) Int. Cl.
*H04W 24/00* (2009.01)
*G01S 11/06* (2006.01)
(Continued)

(52) U.S. Cl.
CPC ............ *G01S 11/06* (2013.01); *B60R 25/245* (2013.01); *G01S 5/0072* (2013.01); *G01S 5/0205* (2013.01);
(Continued)

(58) Field of Classification Search
CPC ....... B60R 25/245; B60R 25/24; G01S 11/04; G01S 11/06; G01S 11/08; G01S 5/0072;
(Continued)

(56) References Cited

U.S. PATENT DOCUMENTS 9,688,247 B1    6/2017    Jayaraman et al.
9,794,753 B1 *  10/2017   Stitt ..................... H04B 17/318
(Continued)

FOREIGN PATENT DOCUMENTS

BR    102014017465 A2    2/2016
CN    104574593 A    4/2015
(Continued)

*Primary Examiner* — Charles T Shedrick
(74) *Attorney, Agent, or Firm* — Harness, Dickey & Pierce, P.L.C.

(57) ABSTRACT

Localization systems and methods are provided and include a first sensor that wirelessly communicates with a portable device using a secure communication connection during first and third time periods and second sensors that transmit broadcast signals over an open advertising communication channel during a second time period between the first and third time periods. The second sensors transmit the broadcast signals based on timing information determined by a control module that also communicates the timing information to the portable device using the secure communication connection. The portable device establishes scanning windows for receiving the broadcast signals based on the timing information and receives first signal information about first signals transmitted over the secure communication connection and second signal information about the broadcast signals transmitted by the second sensors. The control module determines a current location of the portable device based on the first signal information and the second signal information.

20 Claims, 11 Drawing Sheets

Related U.S. Application Data

(60) Provisional application No. 62/560,377, filed on Sep. 19, 2017.

(51) Int. Cl.

| | | |
|---|---|---|
| *G01S 11/08* | (2006.01) | |
| *G01S 5/00* | (2006.01) | |
| *B60R 25/24* | (2013.01) | |
| *H04B 17/318* | (2015.01) | |
| *G07C 9/00* | (2020.01) | |
| *H04W 4/80* | (2018.01) | |
| *H04W 4/40* | (2018.01) | |
| *G01S 5/02* | (2010.01) | |
| *G01S 11/04* | (2006.01) | |

(52) U.S. Cl.
CPC ............... *G01S 11/04* (2013.01); *G01S 11/08* (2013.01); *G07C 9/00309* (2013.01); *H04B 17/318* (2015.01); *H04W 4/40* (2018.02); *H04W 4/80* (2018.02); *B60R 25/24* (2013.01); *G07C 2009/00325* (2013.01); *G07C 2009/00412* (2013.01); *G07C 2009/00547* (2013.01); *G07C 2209/63* (2013.01)

(58) Field of Classification Search
CPC ........... G07C 2009/00325; G07C 2009/00412; G07C 2009/00547; G07C 9/00309; G07C 2209/63; H04B 17/318; H04W 4/40; H04W 4/80

See application file for complete search history.

(56) References Cited

U.S. PATENT DOCUMENTS

| | | | |
|---|---|---|---|
| 9,894,492 | B1 | 2/2018 | Elangovan et al. |
| 10,002,479 | B2 | 6/2018 | Oz et al. |
| 2011/0215921 | A1 | 9/2011 | Ben Ayed et al. |
| 2012/0045058 | A1 | 2/2012 | Weghaus |
| 2014/0002236 | A1* | 1/2014 | Pineau .................... G06F 21/32 340/5.6 |
| 2014/0188348 | A1 | 7/2014 | Gautama et al. |
| 2014/0274013 | A1 | 9/2014 | Santavicca |
| 2015/0148989 | A1 | 5/2015 | Cooper et al. |
| 2015/0161832 | A1 | 6/2015 | Esselink et al. |
| 2015/0235486 | A1 | 8/2015 | Ellis et al. |
| 2015/0310681 | A1 | 10/2015 | Avery et al. |
| 2015/0356797 | A1 | 12/2015 | McBride et al. |
| 2016/0150407 | A1 | 5/2016 | Michaud et al. |
| 2017/0062938 | A1 | 3/2017 | Cheng et al. |
| 2017/0104589 | A1 | 4/2017 | Lambert et al. |
| 2017/0132533 | A1 | 5/2017 | Darnell et al. |
| 2017/0309098 | A1 | 10/2017 | Watters et al. |
| 2017/0330402 | A1 | 11/2017 | Menard et al. |
| 2018/0029560 | A1 | 2/2018 | Mohaupt et al. |
| 2018/0126952 | A1 | 5/2018 | Niemiec |
| 2018/0154865 | A1 | 6/2018 | Bianchi, III et al. |
| 2018/0269565 | A1 | 9/2018 | Guthrie et al. |
| 2019/0222958 | A1* | 7/2019 | Golgiri .................... H04W 4/70 |

FOREIGN PATENT DOCUMENTS

| | | |
|---|---|---|
| FR | 3023314 A1 | 1/2016 |
| WO | WO-16156682 A1 | 1/2016 |
| WO | WO-18040641 A1 | 3/2018 |

* cited by examiner

LOCALIZATION SYSTEMS AND METHODS USING COMMUNICATION PROTOCOLS WITH OPEN CHANNELS AND SECURE COMMUNICATION CONNECTIONS

CROSS-REFERENCE TO RELATED APPLICATIONS

This application is a continuation of U.S. application Ser. No. 16/123,052, filed Sep. 6, 2018, which application claims the benefit of U.S. Provisional Application No. 62/560,377, filed on Sep. 19, 2017. The entire disclosures of the above applications are incorporated herein by reference.

FIELD

The present disclosure relates to localization systems and methods and, more particularly, to localization systems and methods using communication protocols with open and secure connection channels.

BACKGROUND

This section provides background information related to the present disclosure which is not necessarily prior art.

PEPS systems allow a vehicle to locate a key associated with the vehicle, such as a wireless key fob carried by a user of the vehicle. Traditionally, PEPS systems allow anyone in possession of a key fob that has been previously paired with a vehicle's central PEPS electronic control unit (ECU) to access the vehicle by simply grabbing the door handle and to start the vehicle with a push of a button. In response to a button push, the central PEPS ECU authenticates the key fob to determine if the key fob is authorized to access the vehicle and uses the signal strength indicated by a plurality of vehicle antennas to estimate the location of the key fob. If the key fob can be authenticated and is located within an authorizing zone, the vehicle's function is made available to the user, i.e. the vehicle doors are unlocked and/or the vehicle is started.

Traditional PEPS systems use proprietary grade radio protocols using low frequency (LF) signals of approximately 125 kHz. LF was selected for early PEPS systems because the wave propagation would allow for relatively accurate estimation of range and location by using signal strength within the typical target activation range of 2 meters. The LF communication systems used with traditional PEPS systems, however, use fixed frequencies for communication and do not implement any frequency hopping scheme or any encryption of communication packets.

SUMMARY

This section provides a general summary of the disclosure, and is not a comprehensive disclosure of its full scope or all of its features.

A system is provided and includes a first sensor configured to perform wireless communication with a portable device using a communication protocol that allows for communication over at least one open advertising communication channel and that allows for communication using a secure communication connection, the first sensor being configured to communicate with the portable device using the secure communication connection during a first time period. The system also includes at least one second sensor configured to perform wireless communication with the portable device by transmitting or receiving at least one broadcast signal over the at least one open advertising communication channel during a second time period. The system also includes a control module configured to receive first signal information about first signals transmitted or received by the first sensor during the first time period and second signal information about second signals transmitted or received by the at least one second sensor during the second time period and to determine a location of the portable device based on the first signal information and the second signal information. The first signal information and the second signal information includes at least one of received signal strength indicator information, angle of arrival information, and time difference of arrival information.

In other features, the first sensor and the at least one second sensor are installed in a vehicle and the control module is further configured to perform a vehicle function including at least one of unlocking a door of the vehicle, unlocking a trunk of the vehicle, and allowing the vehicle to be started based on the location of the portable device.

In other features, the first sensor is configured to communicate with the portable device using the secure communication connection by performing frequency hopping spread spectrum communication.

A method is provided an includes performing, with a first sensor, wireless communication with a portable device using a communication protocol that allows for communication over at least one open advertising communication channel and that allows for communication using a secure communication connection, the first sensor performing the wireless communication with the portable device using the secure communication connection during a first time period. The method also includes performing, with at least one second sensor, wireless communication with the portable device by transmitting or receiving at least one broadcast signal over the at least one open advertising communication channel during a second time period. The method also includes receiving, with a control module, first signal information about first signals transmitted or received by the first sensor during the first time period and second signal information about second signals transmitted or received by the at least one second sensor during the second time period. The method also includes determining, with the control module, a location of the portable device based on the first signal information and the second signal information. The first signal information and the second signal information includes at least one of received signal strength indicator information, angle of arrival information, and time difference of arrival information.

In other features, the first sensor and the at least one second sensor are installed in a vehicle, the method further comprising performing a vehicle function including at least one of unlocking a door of the vehicle, unlocking a trunk of the vehicle, and allowing the vehicle to be started based on the location of the portable device.

In other features, the first sensor performs communication with the portable device using the secure communication connection by performing frequency hopping spread spectrum communication.

Another system is provided and includes a plurality of sensors configured to perform wireless communication with a portable device using a communication protocol that allows for communication over at least one open advertising channel and that allows for communicating using a secure communication connection, the plurality of sensors being configured to communicate with the portable device by transmitting or receiving at least one broadcast signal over the at least one open advertising communication channel, the plurality of sensors and the portable device being configured to synchronize at least one transmit time to transmit the at least one broadcast signal with at least one scanning window to receive the at least one broadcast signal. A control module is configured to receive signal information about the at least one broadcast signal transmitted or received by the plurality of sensors and to determine a location of the portable device based on the signal information. The signal information includes at least one of received signal strength indicator information, angle of arrival information, and time difference of arrival information.

In other features, the plurality of sensors are installed in a vehicle and the control module is further configured to perform a vehicle function including at least one of unlocking a door of the vehicle, unlocking a trunk of the vehicle, and allowing the vehicle to be started based on the location of the portable device.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
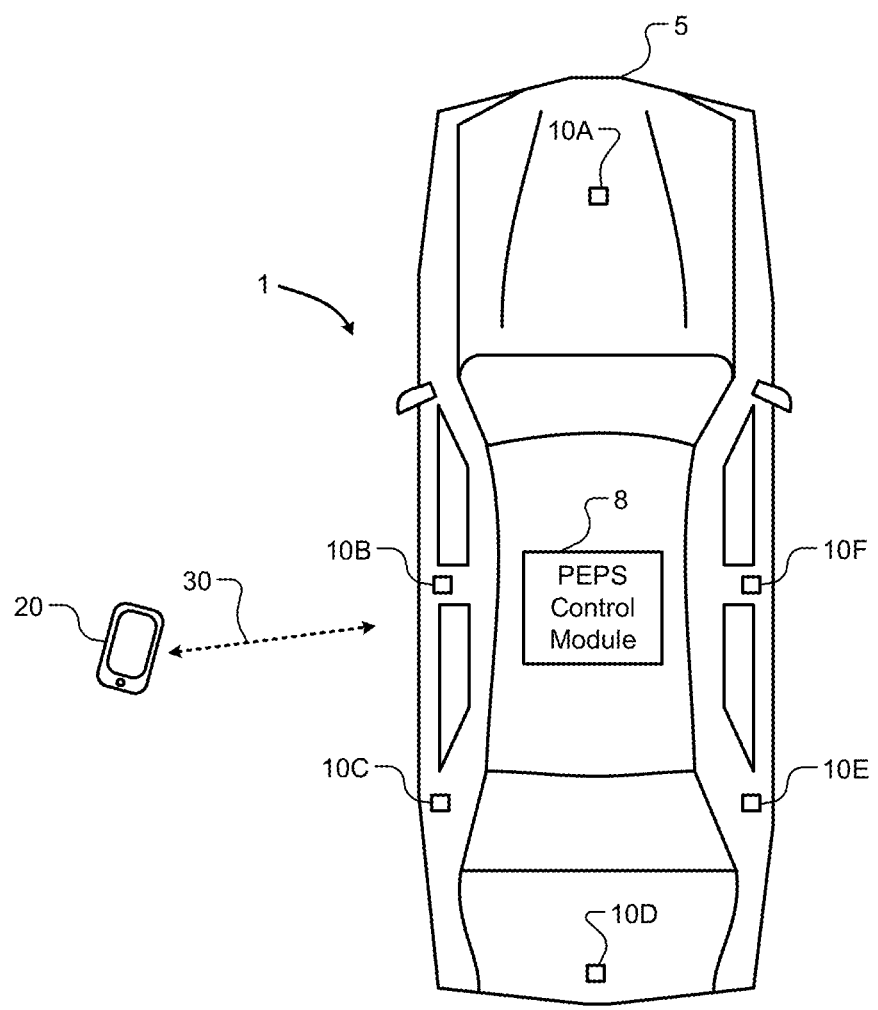
FIG. 1 illustrates a subject vehicle with a localization system according to the present disclosure.

Example embodiments will now be described more fully with reference to the accompanying drawings.

The present disclosure relates to systems, methods, and architecture to implement a localization system using a consumer grade wireless protocol that employs both open communication channels and secure communication connections. For example, the open communication channels can be used to broadcast and receive advertising packets between two communication devices, such as a portable device and one or more sensors, such as vehicle sensors. The advertising packets are generally broadcast on the open communication channels such that any communication device within a communication range of the broadcasting communication device can receive the advertising packets without the need for particular communication information, such as information regarding the timing, encryption, decoding, etc., of the communication packets. The secure connection communication channels can be used for secure communication between two communication device, such as a portable device and one or more sensors, such as vehicle sensors.

Communication devices can communicate using a secure connection by using particular communication information, such as information regarding the timing, encryption, decoding, etc., of the communication packets, that is known by the communicating devices. In this way, it is more difficult for a third-party to eavesdrop or intercept on packets sent over the secure communication connection between the communication devices. For example, communication protocols that utilize secure communication connections can use using frequency hopping spread spectrum (FHSS) communication, direct-sequence spread spectrum (DSSS) communication, or orthogonal frequency-division multiplexing (OFDM) communication during communication over the secure communication connection. For example, the Bluetooth Low Energy (BLE) communication protocol uses FHSS communication during communication over the secure communication connection. For further example, the Wi-Fi and Wi-Fi direct communication protocol uses DSSS and/or OFDM communication during communication over the secure communication connection. Additionally or alternatively, the communication devices can use encryption for communication packets sent over the secure communication connection.

In accordance with the present teachings, communication protocols using both open and secure connection communication channels can be used for localization systems such as a PEPS system. In such case, a communication protocol using both open and secure connection communication channels can be used for communication between a vehicle, including sensors of a vehicle, and a portable device. The portable device, for example, can be a key fob, a smartphone, a tablet, a wearable computing device (such as a smartwatch, a bracelet, a necklace, a ring, etc.), or any other suitable computing device configured for communication with a PEPS system using a communication protocol with both open and secure connection communication channels. The wireless protocols also allow for limited unencrypted communication over open advertising channels without using secure communication channels, but also allow for communication over secure communication channels using spread spectrum communication techniques, such as FHSS, DSSS, and/or OFDM. Communication between two communication devices using spread spectrum techniques, such as FHSS, DSSS, and/or OFDM, increases security, increases privacy, reduces power usage, and increases reliability of the communication between the two devices. For example, communication over secure communication channels make it difficult for unauthorized devices to know the channel, timing, and/or decoding information to receive the next communication packet(s) between the two devices. This feature makes it difficult for unauthorized devices to spy on the communication between a portable device and a PEPS system of the vehicle using secure communication channels.

Figure 2:
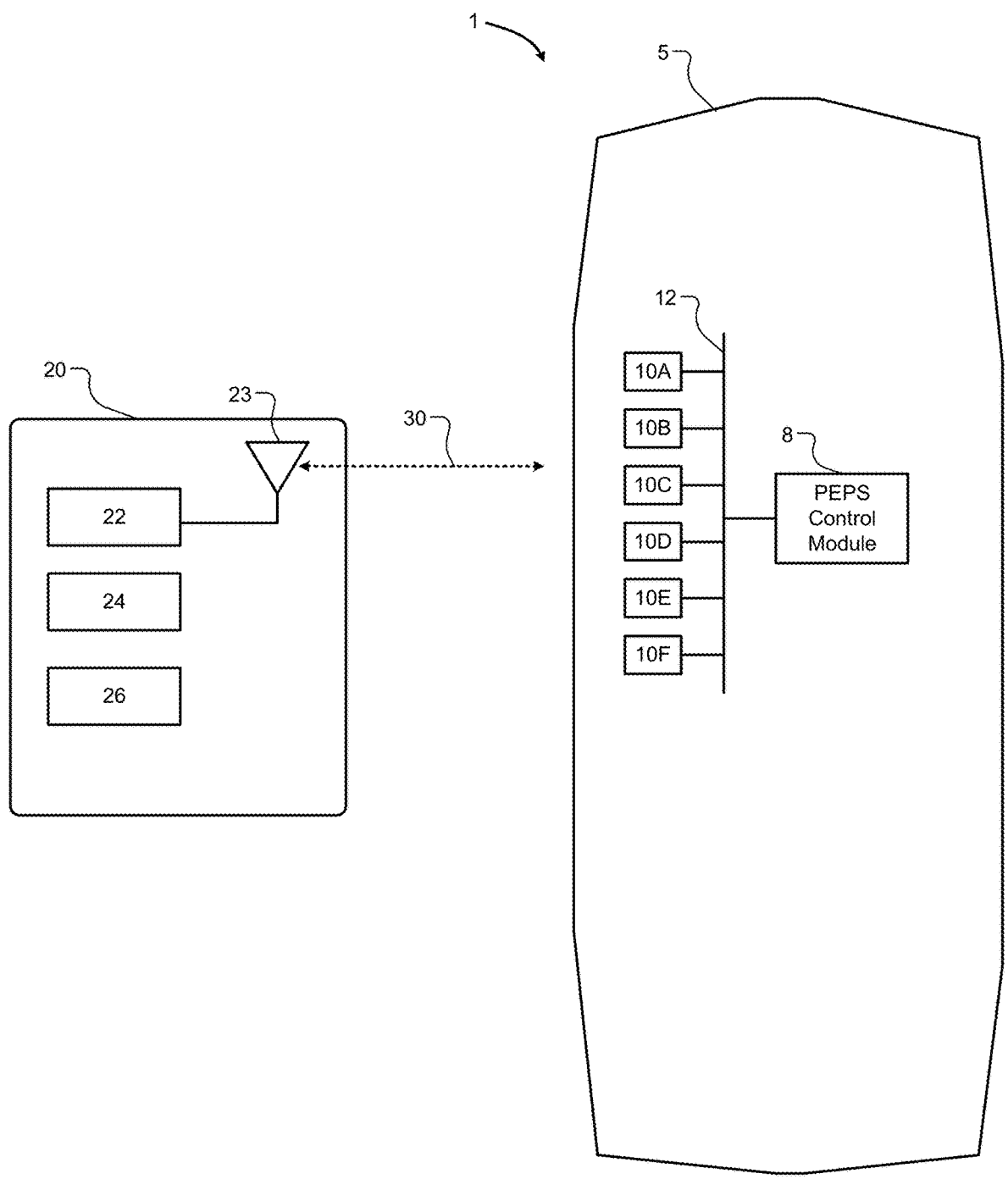
FIG. 2 illustrates a block diagram for a localization system according to the present disclosure.

With reference to FIGS. 1 and 2, a PEPS system 1 is provided within a vehicle 5 and includes a PEPS control module 8 and a plurality of sensors 10A to 10F, collectively referred to as 10. The PEPS control module 8 can be implemented as a PEPS electronic control unit (ECU). The PEPS control module 8 can communicate with the plurality of sensors 10 using a vehicle interface 12. The vehicle interface 12, for example, can include a controller area network (CAN) bus and/or a lower data rate communication bus, such as a local interconnect network (LIN) bus. The vehicle interface 12 can also include a clock extension peripheral interface (CXPI) bus. Additionally or alternatively, the vehicle interface 12 can include a combination of CAN bus, LIN, and CXPI bus communication interfaces.

The PEPS control module 8 can locate a portable device 20 by measuring some aspect of the wireless communication signals between the portable device 20 and the sensors 10 of the vehicle 5. For example, the PEPS control module 8 can measure the received signal strengths of the communication signals between the portable device 20 and the various sensors 10. In such case, the PEPS control module 8 can determine the location of the portable device 20 based on, for example, the patterns of the received signal strength indicator (RSSI) for the various signals sent and received between the portable device 20 and the sensors 10 of the vehicle 5. For example, a relatively strong RSSI generally indicates that the communicating devices are closer and a relatively weak RSSI generally indicates that the communicating devices are farther away. By analyzing the RSSI for communication signals sent between the portable device 20 and each of the sensors 10, the PEPS control module 8 and/or the portable device 20 itself can determine a location of the portable device 20 relative to the vehicle 5. Additionally or alternatively, angle of arrival or time difference of arrival measurements for the signals sent and received between the sensors 10 and the portable device 20 can also be used by the PEPS control module 8 to determine the location of the portable device 20.

Consumer grade wireless protocols employing FHSS communication, such as Bluetooth and/or Bluetooth Low Energy (BLE), for example, typically operate within the 2,400 to 2483.5 MHz band to use at least 15 channels and must not occupy any particular for more than 0.4 seconds, as required by the Federal Communications Commission regulation 47 C.F.R. 15.247(a)(1)(iii). As noted above, Bluetooth and BLE use FHSS. Wi-fi and Wi-fi direct can use DSSS and/or OFDM.

The portable device 20 can include a communication chipset 22, such as a BLE chipset, a Wi-Fi chipset, or a Wi-Fi direct chipset, connected to an antenna 23. The portable device 20 can also include application software stored in a computer-readable storage module or device 24. The portable device 20 can also optionally include a GPS module 26 or other device location service. The portable device 20 sends and receives communication signals 30 to and from the sensors 10.

Figure 3:
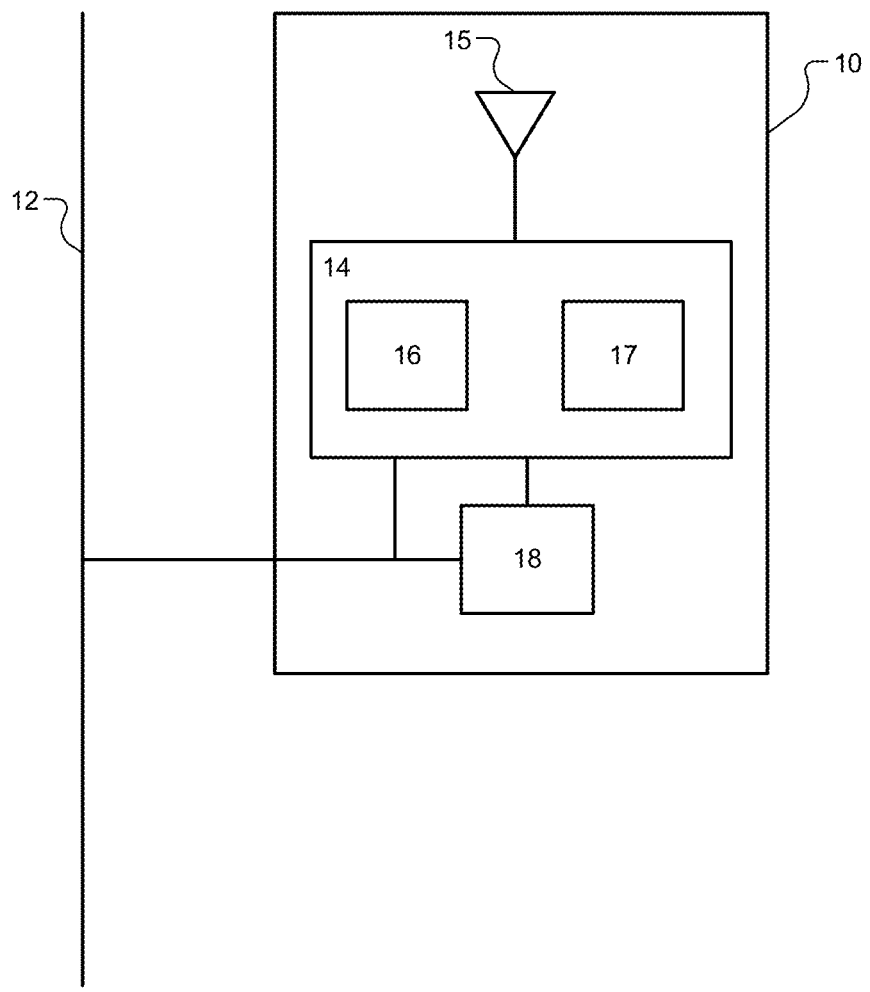
FIG. 3 illustrates a block diagram for a sensor of a localization system according to the present disclosure.

With reference to FIG. 3, each of the sensors 10 includes a communication chipset 14, such as a BLE chipset, a Wi-Fi chipset, or a Wi-Fi direct chipset, connected to an antenna 15. As shown in FIG. 3, the antenna 15 may be located internal to the sensor 10. Alternatively, the antenna 15 may be located external to the sensors 10. The sensors 10 receive communication signals from the portable device 20 using the antenna 15. In the example of FIG. 3, the sensor 10 is configured with a BLE chipset for BLE communication. In the example of FIG. 3, the sensor 10 receives BLE physical layer messages using a BLE physical layer (PHY) controller 16. The sensor 10 is capable of observing BLE physical layer messages and taking measurements of the physical properties of the associated signals, including, for example, the received signal strength (RSSI) using a channel map that is produced by a channel map reconstruction module 17. Additionally or alternatively, the sensor 10 can determine other measurements of the physical properties of the associated signals, including, for example, data related to the angle of arrival. Additionally or alternatively, the various sensors 10 can communicate with each other and/or communicate with the PEPS control module 8 via the vehicle interface 12 to determine time difference of arrival, time of arrival, or angle of arrival data for signals received by the various sensors. A timing synchronization module 18 is configured to accurately measure the reception times of messages on the vehicle interface 12 and pass the timing information to the communication chipset 14. The communication chipset is configured to take the channel map information and the timing signals and tune the PHY controller 16 to a specific channel at a specific time and observe all physical layer messages and data that conform to the physical layer specification for the communication protocol being used. The data, timestamps, and measured signal strength are reported by the communication chipset 14 to the PEPS control module 8 of the vehicle 5 via the vehicle Interface 12.

In addition to the sensors 10, as discussed in further detail below, the PEPS control module 8 may have a separate communication module that includes a communication chipset 14, such as a BLE chipset, a Wi-Fi chipset, or a Wi-Fi direct chipset, connected to an antenna 15 for direct communication with the portable device 20, similar to the sensor 10 shown in FIG. 3. The communication module of the PEPS control module 8 can be configured for BLE communication, for example, and can receive BLE physical layer messages using a BLE physical layer (PHY) controller 16. Additionally or alternatively, the communication module can be configured for Wi-Fi or Wi-Fi direct communication. The communication module of the PEPS control module 8 can communicate directly with the portable device 20 and can provide, for example, communication information, such as synchronization and timing information, to the portable device, as discussed in detail below. Similar to the sensor 10 shown in FIG. 3, the communication module of the PEPS control module 8 can include a timing synchronization module 18 configured to accurately measure the reception times of messages on the vehicle interface 12 and pass the timing information to the BLE chipset. The communication chipset is configured to take the channel map information and the timing signals and tune the PHY controller 16 to a specific channel at a specific time and observe all physical layer messages and data that conform to the physical layer specification of the communication protocol being used.

Figure 4:
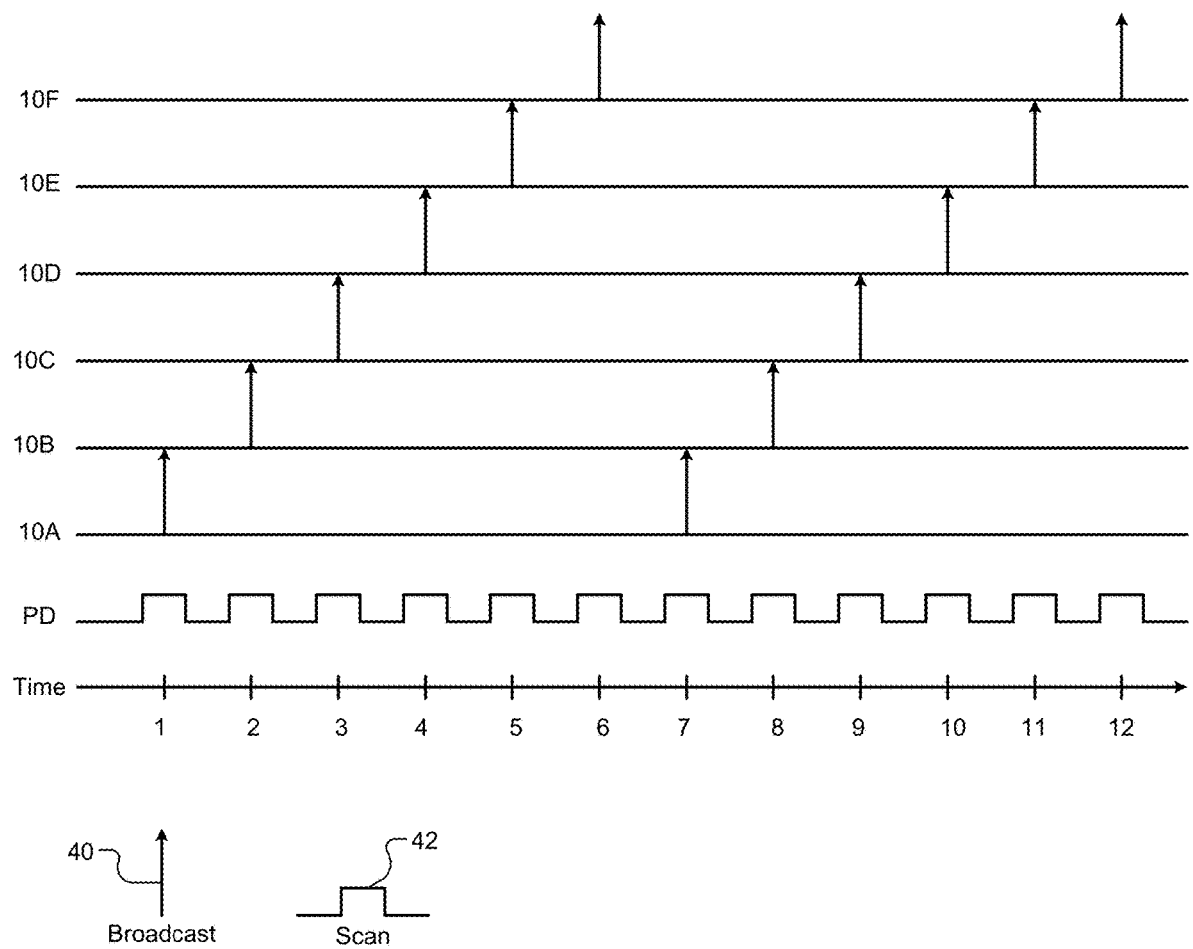
FIG. 4 illustrates a timing diagram for communication between a portable device and sensors according to an implementation of the present disclosure.

With reference to FIG. 4, a timing diagram is shown for an example implementation of a PEPS system 1 using a communication protocol that uses both open and secure connection channels, such as BLE, Wi-Fi, or Wi-Fi direct. In the example implementation of FIG. 4, the portable device 20 (indicated as PD) communicates with the sensors 10A to 10F over the available open advertising channels of the communication protocol. In this way, in the example implementation of FIG. 4, while using a communication protocol that allows for communication over secure connection channels, the PEPS system 1 actually avoids communication over the secure connection channels and communicates only over the open advertising channels that do not require particular communication information, such as timing, synchronization, encryption, etc., information.

In FIG. 4, the passage of time is indicated from left to right, an advertising broadcast signal is indicated by an arrow (designated as 40 at the bottom of the figure), and a scanning/listening window is indicated by a raised interval (designated as 42 at the bottom of the figure). The time line is incremented with an indicated time period of 1 to 12 for purposes of illustration.

In the example of FIG. 4, the portable device 20 scans/listens for a broadcast signal at scanning/listening windows that are centered on each of the time intervals 1 to 12, while one of the sensors 10A to 10F transmits an advertising broadcast signal during each time interval. For example, at each of the time intervals, the portable device 20 begins scanning/listening just before the time interval and continues scanning/listening until just after the time interval. In this way, the scanning/listening windows extend for a period of time centered on each of the time intervals. For example, sensor 10A transmits a broadcast signal at time intervals 1 and 7. Sensor 10B transmits a broadcast signal at time intervals 2 and 8. Sensor 10C transmits a broadcast signal at time intervals 3 and 9. Sensor 10D transmits a broadcast signal at time intervals 4 and 10. Sensor 10E transmits a broadcast signal at time intervals 5 and 11. Sensor 10F transmits a broadcast signal at time intervals 6 and 12.

The portable device 20 can measure one or more aspects of the broadcast signals transmitted by each of the sensors 10A to 10E. For example, the portable device 20 can measure RSSI, angle of arrival, and/or time difference of arrival. The portable device 20 can then communicate the measured data, along with data included in the advertising broadcast signals and time stamps for the received signals to the PEPS system 1. For example, the portable device 20 can communicate data, time stamps, and the measured data to the PEPS control module 8 through one of the sensors 10A to 10F or through a dedicated central communication module of the PEPS control module 8. The PEPS control module 8 can then determine the location of the portable device based on the communicated information from the portable device 20. Alternatively, the portable device 20 itself can process the data, time stamps, and measured data, such as RSSI, angle of arrival, and/or time difference of arrival, to determine its location relative to the vehicle 5 and can communicate its location to the PEPS control module 8 of the PEPS system 1 either through one of the sensors 10 or through the communication module of the PEPS control module 8.

Based on the determined location of the portable device 20, the PEPS system 1 can then authorize or perform a vehicle function, such as unlocking a door of the vehicle 5, unlocking a trunk of the vehicle 5, starting the vehicle, and/or allowing the vehicle to be started, based on the location of the portable device 20.

In the example implementation of FIG. 4, optimally the portable device 20 and the sensors 10A to 10F can be synchronized so that the broadcast transmissions of the sensors 10A to 10F line up and coincide with the scanning/listening windows of the portable device 20. To perform synchronization, one of the broadcast transmissions from the sensors 10A to 10F can include synchronization information regarding the timing of the broadcast transmissions, such as the timing interval, the next transmit time, etc. In such case, the portable device 20 can start an initial scanning/listening window at a first time period, and, if it does not receive a broadcast transmission, can then adjust the timing of the next scanning/listening window by a predetermined or calculated offset. The portable device 20 can continue to scan/listen and then adjust the next scanning/listening window by the predetermined or calculated offset until it receives a broadcast transmission. Once it receives an initial broadcast transmission from one of the sensors 10A to 10F, the portable device 20 can then adjust the timing for its scanning/listening windows to match the timing of the broadcast transmissions from the sensors 10A to 10F. Alternatively, a central communication module of the PEPS control module 8 can be used to communicate with the portable device 20 and provide the portable device 20 with the timing and packet transmission information, such as the timing interval and the next transmit time. For example, a communication module of the PEPS control module 8 can provide the timing interval and next transmit time information to the portable device 20. Once received, the portable device 20 can start its next scanning/listening window at the appropriate time to receive the next broadcast transmission from one of the sensors 10A to 10F.

In this way, in the example of FIG. 4, it is only necessary for the portable device 20 to scan/listen for broadcast signals transmitted from the sensors during the applicable scanning/listening windows, shown at each of time intervals 1 to 12 in FIG. 4. As such, it is not necessary for the portable device 20 to scan/listen for the broadcast signals all of the time. In this way, the portable device can conserve power during the periods of time between the scanning/listening windows. In this way, the portable device 20 in the example implementation of FIG. 4 is more power efficient than a comparable portable device that would otherwise be required to scan/listen all of the time for advertising broadcast signals transmitted from sensors of the vehicle. In this way, the example implementation of FIG. 4 provides the technical benefits of conserving power of the portable device 20 by only scanning/listening for advertising broadcast signals during the appropriate time intervals.

Figure 5:
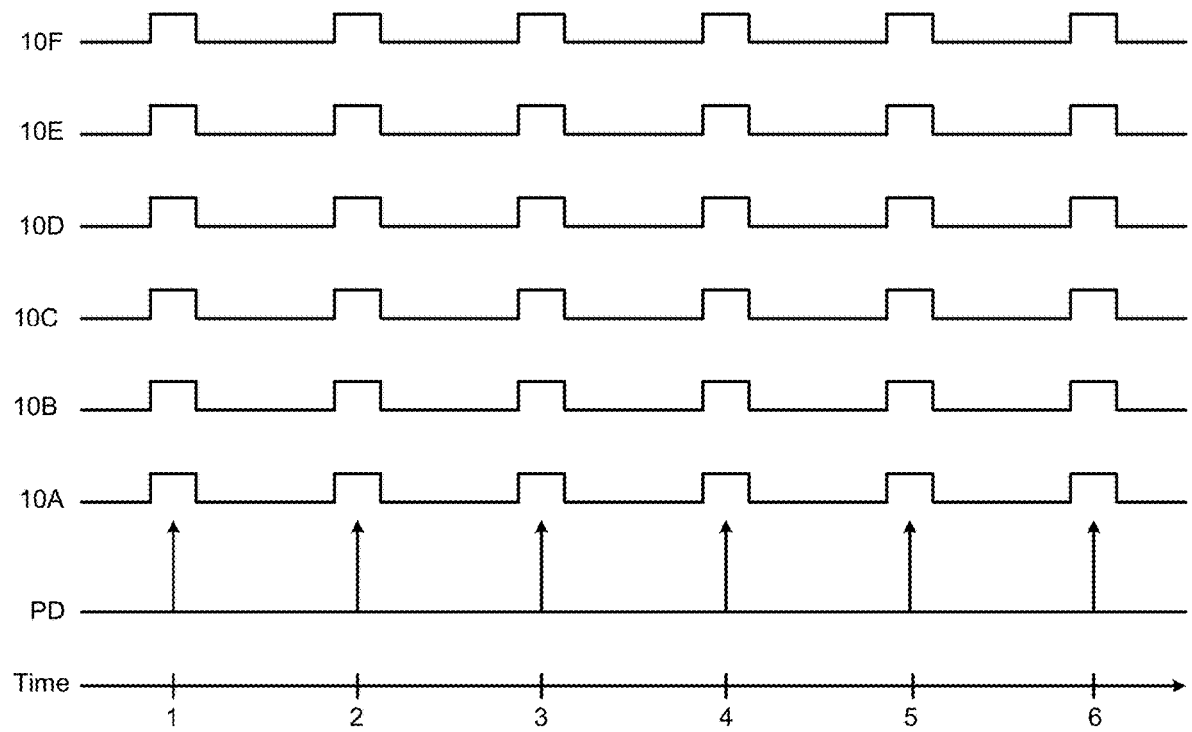
FIG. 5 illustrates another timing diagram for communication between a portable device and sensors according to another implementation of the present disclosure.
Figure 5:
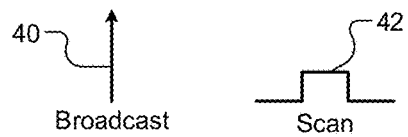

With reference to FIG. 5, a timing diagram is shown for another example implementation of a PEPS system 1 using a communication protocol with both open and secure connection channels. The example implementation of FIG. 5 is similar to the example implementation of FIG. 4 in that the portable device 20 (indicated as PD) communicates with the sensors 10A to 10F only over the available open advertising channels. In this way, in the example implementation of FIG. 5, while using a communication protocol that allows for secure connection communications, the PEPS system 1 actually avoids communication over secure connections and only communicates over the open advertising channels that do not require frequency hopping. In the example of FIG. 5, however, instead of the sensors 10A to 10F transmitting the advertising broadcast signals, the portable device 20 periodically transmits the advertising broadcast signals while the sensors 10A to 10F scan/listen for the transmitted broadcast signals from the portable device 20.

Similar to FIG. 4, in FIG. 5 the passage of time is indicated from left to right, an advertising broadcast signal is indicated by an arrow (designated as 40 at the bottom of the figure), and a scanning/listening window is indicated by a raised interval (designated as 42 at the bottom of the figure).

In the example of FIG. 5, the portable device 20 transmits a broadcast signal at each time interval while each of the sensors 10A to 10F scan/listen for the broadcast signal at each interval. In the example of FIG. 5, the sensors 10 scan/listen for a broadcast signal at scanning/listening windows that are centered on each of the time intervals 1 to 6, while the portable device 20 transmits a broadcast signal during each time interval. For example, at each of the time intervals, the sensors 10 begin scanning/listening just before the time interval and continue scanning/listening until just after the time interval. In this way, the scanning/listening windows extend for a period of time centered on each of the time intervals.

In the example of FIG. 5, the sensors 10A to 10F can each measure one or more aspects of the broadcast signals transmitted by the portable device 20. For example, the sensors 10 can measure RSSI, angle of arrival, and/or time difference of arrival. The sensors 10 can then communicate the measured data, along with data included in the broadcast signals and time stamps for the received signals to the PEPS system 1. For example, the sensors 10 can communicate data, time stamps, and the measured data to the PEPS control module 8 through the vehicle interface 12. The PEPS control module 8 can then determine the location of the portable device based on the communicated information from the sensors 10.

Based on the determined location of the portable device 20, the PEPS system 1 can then authorize or perform a vehicle function, such as unlocking a door of the vehicle 5, unlocking a trunk of the vehicle 5, starting the vehicle, and/or allowing the vehicle to be started, based on the location of the portable device 20.

In the example implementation of FIG. 5, similar to the example implementation of FIG. 4, optimally the portable device 20 and the sensors 10A to 10F are synchronized so that the broadcast transmissions of the portable device line up or coincide with the scanning/listening windows of the sensors 10A to 10F. For example, one of the broadcast transmissions from the portable device 20 can include synchronization information regarding the timing of the broadcast transmissions, such as the timing interval, the next transmit time, etc. In such case, one or more of the sensors 10 can start an initial scanning/listening window at a first time period, and, if a broadcast transmission is not received, the timing of the next scanning/listening window can be adjusted by a predetermined or calculated offset. The one or more sensors 10 can continue to scan/listen and then adjust the next scanning/listening window by the predetermined or calculated offset until a broadcast transmission is received. Once an initial broadcast transmission is received from the portable device 20, the sensors 10A to 10F can communicate with each other to adjust the timing for the scanning/listening windows to match the timing of the broadcast transmissions from the portable device 20. Alternatively, a communication module of the PEPS control module 8 in the vehicle 5 can be used to communicate and synchronize the timing and packet transmission information, such as the timing interval and the next transmit time, so that the scan/listening windows of the sensors 10 line up or coincide with the broadcast transmission of the portable device 20. For example, the communication module of the PEPS control module 8 can receive the timing interval and next transmit time information from the portable device 20. Once received, the PEPS control module 8 can communicate the timing interval and next transmit time information to the sensors 10, which can then start their next scanning listening windows at the appropriate time to receive the next broadcast transmission from the portable device 20.

In this way, in the example of FIG. 5, it is only necessary for the sensors 10 to scan/listen for broadcast signals transmitted from the portable device 20 during the applicable scanning/listening windows, shown at each of time intervals 1 to 6 in FIG. 4. As such, it is not necessary for the sensors 10 to scan/listen for the broadcast signals all of the time. In this way, the vehicle 5 can conserve power during the periods of time between the scanning/listening windows. In this way, the sensors 10 and the vehicle 5 in the example implementation of FIG. 4 is more power efficient than a comparable system that would otherwise be required to scan/listen all of the time for broadcast signals transmitted from a portable device. In this way, the example implementation of FIG. 5 provides the technical benefits of conserving power of the sensors 10 and/or the vehicle 5 by only scanning/listening for broadcast signals during the appropriate time intervals.

Figure 6:
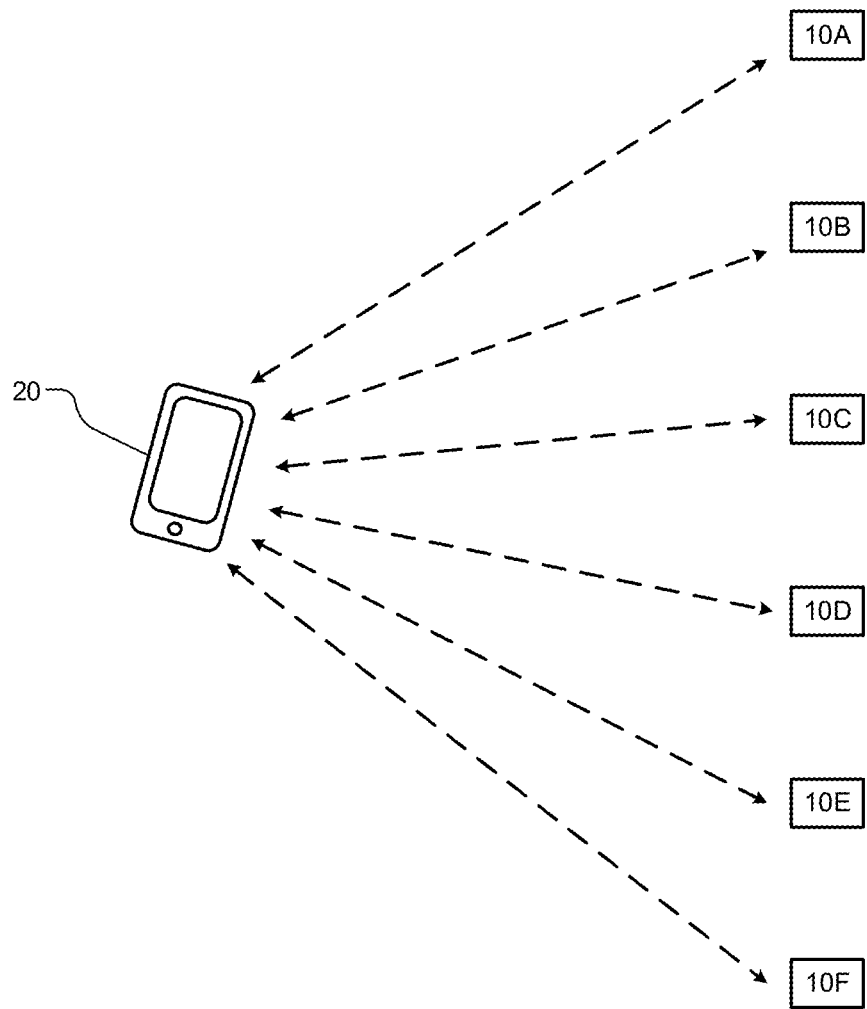
FIG. 6 illustrates a portable device and sensors according to another implementation of the present disclosure.
Figure 7:
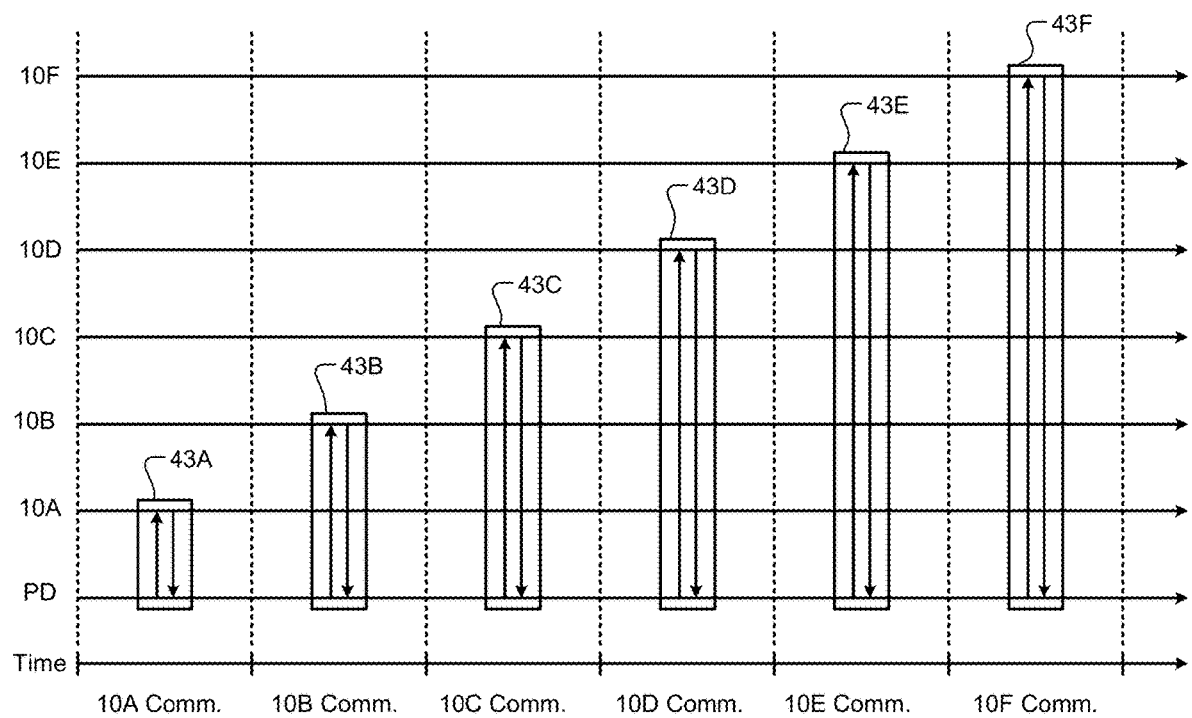
FIG. 7 illustrates another timing diagram for communication between a portable device and sensors according to another implementation of the present disclosure.

With reference to FIGS. 6 and 7, another example implementation is shown. In the example implementation of FIGS. 6 and 7, instead of communicating over the open advertising channels, the portable device 20 establishes individual secure connections with each of the sensors 10 using the secure connection channels of the communication protocol, such as BLE, Wi-Fi, or Wi-Fi direct. In this example implementation, the portable device 20 serves as the central device or master and establishes individual secure connections with each individual sensor 10A to 10F serving as a peripheral device or slave, as shown in FIG. 6. In this way, a private area network (PAN) star topology is established with the portable device serving as the central device or master and each of the sensors serving as a peripheral device or slave. In this example implementation, the communication links between the portable device 20 and each of the sensors 10 can utilize communication protocols using FHSS, DSSS, and/or OFDM, such as Bluetooth, Wi-Fi, and/or Wi-Fi direct, and/or can utilize encrypted communication packets. As such, communication between the portable device 20 and each of the sensors 10 is private, secure, and difficult to intercept or track by a third-party or unauthorized device.

With reference to FIG. 7, a timing diagram is shown for the example implementation of FIG. 6, using a communication protocol with both open and secure connection channels, such as BLE, Wi-Fi, or Wi-Fi direct. As noted above, unlike the example implementations of FIGS. 4 and 5, in the example implementation of FIGS. 6 and 7, the portable device 20 establishes individual secure communication links with each of the sensors. As such, the portable device 20 establishes individual communication windows for each of the sensors, labelled "10A Comm.," "10B Comm.," "10C Comm.," "10D Comm.," "10E Comm.," and "10F Comm." in FIG. 7, with the passage of time proceeding from left to right in the figure. In each of the communication windows, the portable device 20 communicates using a secure connection with each respective sensor. For example, the portable device 20 communicates with sensor 10A using secure connection 43A, with sensor 10B using secure connection 43B, with sensor 10C using secure connection 43C, with sensor 10D using secure connection 43D, with sensor 10E using secure connection 43E, and with sensor 10F using secure connection 43F. The secure connections 43A to 43F are generically referred to as secure connections 43 or secure connection 43. During each secure connection 43, the portable device and the respective sensor 10 can communicate with the master device, in this case the portable device 20 transmitting an initial communication packet and the slave device, in this case the sensor 10, sending a response communication packet. While one initial communication from the portable device 20 and one response communication from the sensor 10 is shown in each secure connection 43 of FIG. 7, multiple rounds of communication packets can be sent back and forth between the portable device 20 and the sensor 10 during each secure connection event. In other words, a secure connection event could have multiple iterations of an initial communication packet sent from the master device to the slave device and of the response communication packet from the slave device to the master device, with multiple communication messages sent and received between the portable device 20 and the sensor 10 during a single connection event and communication window, in accordance with the specifications of the particular communication protocol being used. The same is true for the secure connections (e.g., 43A-1, 43A-2, 43A-3, and 43A-4) illustrated in FIGS. 8 to 11, which are discussed in further detail below.

Further, in accordance with the specifications of the particular communication protocol being used, the portable device 20 coordinates and synchronizes the communication with each individual sensor 10 so that each sensor knows the timing and the particular channel to use for the next communication. For example, if an FHSS communication protocol is being used, the portable device 20 coordinates the communication with each sensor 10 so that both devices know the channel or frequency to use for the next communication and the timing for when that communication should occur. Because the portable device 20 establishes individual secure communication links with each of the sensors 10, it must coordinate the timing and frequency hopping for each of the individual secure communication links and communicate the appropriate timing and synchronization information to each of the individual sensors 10.

The portable device 20 can measure one or more aspects of the signals transmitted by each of the sensors 10A to 10E during each communication window. For example, the portable device 20 can measure RSSI, angle of arrival, and/or time difference of arrival. The portable device 20 can then communicate the measured data, along with data included in the broadcast signals and time stamps for the received signals to the PEPS system 1. For example, the portable device 20 can communicate data, time stamps, and the measured data to the PEPS control module 8 through one of the sensors 10A to 10F or through a dedicated central communication module of the PEPS control module 8. The PEPS control module 8 can then determine the location of the portable device 20 based on the communicated information from the portable device 20. Alternatively, the portable device 20 itself can process the data, time stamps, and measured data, such as RSSI, angle of arrival, and/or time difference of arrival, to determine its location relative to the vehicle 5 and can communicate its location to the PEPS control module 8 of the PEPS system 1 either through one of the sensors 10 or through the communication module of the PEPS control module 8. Additionally or alternatively, the sensors 10 can measure RSSI, angle of arrival, and/or time difference of arrival for the communication signals sent and received between the portable device 20 and the sensors 10 and can communicate the measured data to the PEPS control module 8 over the vehicle interface 12. The PEPS control module 8 can then determine the location of the portable device 20 based on the communicated information from the sensors 10.

Based on the determined location of the portable device 20, the PEPS system 1 can then authorize or perform a vehicle function, such as unlocking a door of the vehicle 5, unlocking a trunk of the vehicle 5, starting the vehicle, and/or allowing the vehicle to be started, based on the location of the portable device 20.

With reference to FIGS. 8-11, timing diagrams are shown for additional example implementations of PEPS systems 1 using a communication protocol with both open and secure connection channels, such as BLE, Wi-Fi, or Wi-Fi direct. While the example implementations of FIGS. 4 and 5 utilized communication only over the available open advertising channels and while the example implementation of FIGS. 6 and 7 utilized communication only over secure communication connections, the example implementations of FIGS. 8-11 provide mixed mode implementations that perform communication using the both the available open advertising channels and the secure communication. For example, in each of the example implementations of FIGS. 8-11 a secure communication connection is established between the portable device 20 and one of the sensors 10. As noted above, unlike communication over the open advertising channels, communication over the secure communication connections is performed with using FHSS, DSSS, and/or OFDM, such as in secure communication connections using Bluetooth, Wi-Fi, and/or Wi-Fi direct. Additionally or alternatively, communication over the secure communication connections can utilize encrypted communication packets. As such, the example implementations of FIG. 8-11 provide a PEPS system 1 that can communicate with the portable device 20 securely using communication packets sent over the secure communication connections, while still allowing for communication between the portable device 20 and the remaining sensors over the open advertising channels.

Figure 8:
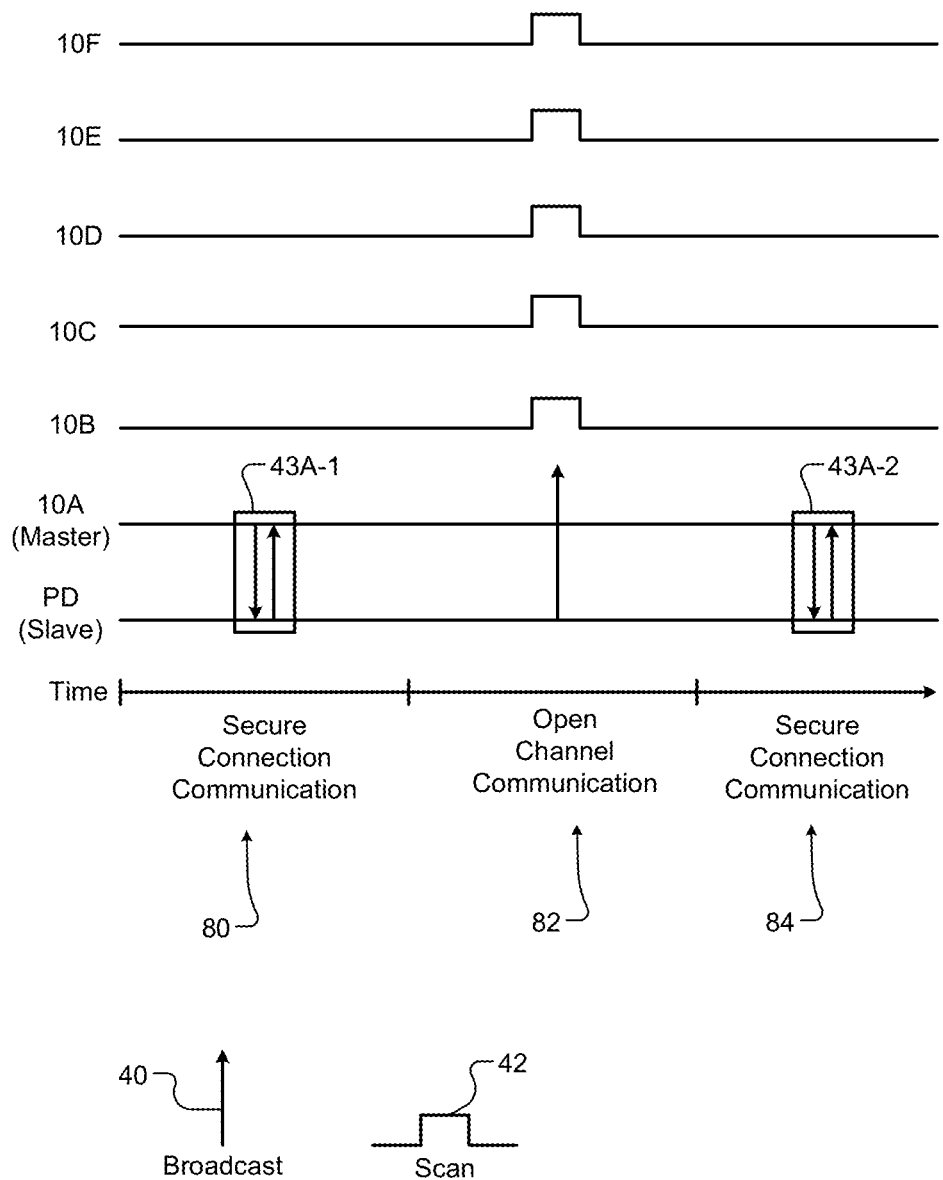
FIG. 8 illustrates another timing diagram for communication between a portable device and sensors according to another implementation of the present disclosure.

With reference to FIG. 8, a timing diagram is shown for an example implementation of a PEPS system 1 using a communication protocol with both open and secure connection channels, such as BLE, Wi-Fi, or Wi-Fi direct, and including communication packets being sent over both the open advertising channels and over secure communication connections 43A-1 and 43A-2. In the example implementation of FIG. 8, the portable device 20 (designated as PD) establishes a secure connection with one of the sensors 10. Specifically, in the example of FIG. 8, the portable device 20 establishes a secure connection with sensor 10A. While sensor 10A is used as an example, the portable device 20 could instead establish a secure connection with any of the sensors 10B to 10F. Additionally or alternatively, the vehicle 5 could include an additional communication node dedicated to performing communication over a secure communication connection with the portable device 20. For example, portable device 20 could establish a secure communication connection with the central communication module of the PEPS control module 8.

In the example implementation of FIG. 8, sensor 10A serves as the master and the portable device 20 serves as the slave for the secure communication connections 43A-1, 43A-2. Further, similar to the above timing diagrams, the passage of time is indicated as proceeding from left to right. As shown in FIG. 8, the example implementation includes a first time period 80 for communication over a secure communication connection 43A-1 between the portable device 20 and the master node sensor 10A. During the first time period 80, communications are performed between the portable device 20 and the master node sensor 10A, as shown by the secure communication connection designated by block 43A-1. As noted above, while a single transmission and response pair is shown in the secure communication connection 43A-1, multiple transmission and response pairs could occur between the portable device 20 and the master node sensor 10A during the secure communication connection event.

The first time period 80 is followed by a second time period 82, during which communications are performed between the portable device 20 and one or more of the other sensors 10B to 10F over the open advertising channels. As noted above, communication over the open advertising channels is not encrypted and does not use frequency hopping. As shown in FIG. 8, during the second time period 82, the portable device 20 transmits broadcast signals 44 during the second time period 82. While a single broadcast signal 44 is shown in the example of FIG. 8 for illustration, the portable device 20 can transmit any number of broadcast signals 44, depending on the length of the second time period 82, the number of sensors 10 communicating over the open advertising channels, etc. As further shown in FIG. 8, sensors 10B to 10F each perform scanning/listening for the transmitted broadcast signals 44 during designated scanning/listening windows 42. Again, while a single scanning/listening window 42 is shown for each sensor 10 in FIG. 8, any number of scanning/listening windows 42 can be used, depending on the length of the second time period 82, the number of sensors 10 communicating over the open advertising channels, etc.

The timing for the communication between the portable device 20 and sensors 10B to 10F can be synchronized and coordinated by, for example, the PEPS control module 8 based on communication with the portable device 20 over the secure communication connection 43A-1 during time period 80. For example, sensor 10A can communicate with the portable device 20 over the secure communication connection 43A-1 and with the PEPS control module 8 over the vehicle interface 12. Once the portable device 20 and the PEPS control module 8 establish the timing for the communication over the open advertising channels, the PEPS control module 8 can inform sensors 10B to 10F of the timing so that the sensors 10B to 10F can synchronize their respective scanning/listening windows 42 accordingly. For example, the portable device 20 could transmit the broadcast signals 44 at predetermined intervals such as, for example 10 ms. The portable device 20 could inform the PEPS control module 8 of the timing for the first (or next) broadcast signal 44 via communication with sensor 10A over the secure communication connection 43A-1. The PEPS control module 8 can then inform sensors 10B to 10F of the time for the first (or next) broadcast signal and can inform the sensors of the timing interval between broadcast signals such as, for example, 10 ms. The sensors 10B to 10F can then synchronize their scanning/listening windows 42 to bracket the anticipated time for the next broadcast signal. For example, if the next broadcast signal 44 is scheduled for at a time of 10 ms, the scanning/listening windows 42 could start at 8 ms and continue until 12 ms to insure the scanning/listening window 42 is active when the broadcast signal 44 is transmitted.

The second time period 82 is followed by a third time period 84, during which the portable device 20 and sensor 10A return to communicating over secure communication connection 43A-2.

In the example of FIG. 8, the sensors 10A to 10F can each measure one or more aspects of the signals transmitted by the portable device 20. For example, sensor 10A can measure aspects of the signals transmitted during the secure connection communications, shown in blocks 43 and sensors 10B to 10F can measure aspects of the broadcast signals 44 transmitted by the portable device 20 over the open communication channels. For example, the sensors 10 can measure RSSI, angle of arrival, and/or time difference of arrival. The sensors 10 can then communicate the measured data, along with data included in the received signals and time stamps for the received signals to the PEPS system 1. For example, the sensors 10 can communicate data, time stamps, and the measured data to the PEPS control module 8 through the vehicle interface 12. The PEPS control module 8 can then determine the location of the portable device based on the communicated information from the sensors 10.

Based on the determined location of the portable device 20, the PEPS system 1 can then authorize or perform a vehicle function, such as unlocking a door of the vehicle 5, unlocking a trunk of the vehicle 5, starting the vehicle, and/or allowing the vehicle to be started, based on the location of the portable device 20.

Figure 9:
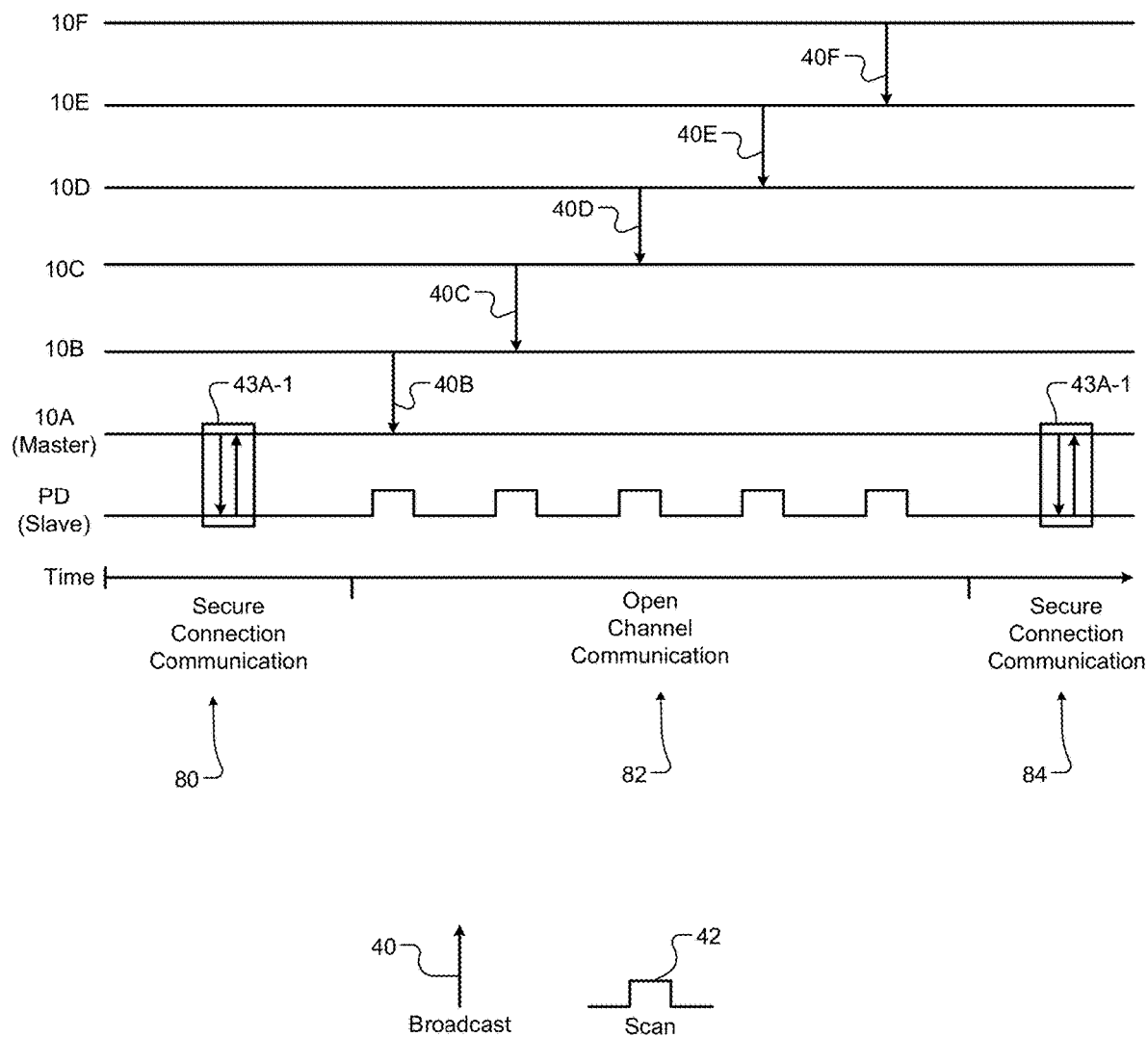
FIG. 9 illustrates another timing diagram for communication between a portable device and sensors according to another implementation of the present disclosure.

With reference to FIG. 9, a timing diagram is shown for another example implementation of a PEPS system 1 using a communication protocol with both open and secure connection channels, such as BLE, Wi-Fi, or Wi-Fi direct, and including communication packets being sent over both the open advertising channels and over secure communication connections 43A-1 and 43A-2. The example implementation of FIG. 9 is similar to the example implementation of FIG. 8 except that in the example implementation of FIG. 9, sensors 10B to 10F send broadcast signals 40B to 40F, respectively, over the open advertising channels during the second time period 82 and the portable device 20 scans/listens for the broadcast signals 40B to 40F during the scanning/listening windows 42 of the second time period 82. Similar to the example implementation of FIG. 8, in the example implementation of FIG. 9, the portable device 20 (designated as PD) establishes a secure connection with one of the sensors 10. Specifically, in the example of FIG. 9, the portable device 20 establishes a secure connection with sensor 10A. While sensor 10A is used as an example, the portable device 20 could instead establish a secure connection with any of the sensors 10B to 10F. Additionally or alternatively, the vehicle 5 could include an additional communication node dedicated to performing communication over a secure communication connection with the portable device 20. For example, portable device 20 could establish a secure communication connection the central communication module of the PEPS control module 8.

In the example implementation of FIG. 9, sensor 10A serves as the master and the portable device 20 serves as the slave for the secure communication connection. Further, similar to the above timing diagrams, the passage of time is indicated as proceeding from left to right. As shown in FIG. 9, the example implementation includes a first time period 80 for communication over secure communication connection 43A-1 between the portable device 20 and the master node sensor 10A. During the first time period 80, secure connection communications are performed between the portable device 20 and the master node sensor 10A, as shown by the communications designated by block 43A-1. As noted above, while a single transmission and response pair is shown in the secure communication connection 43A-1, multiple transmission and response pairs could occur between the portable device 20 and the master node sensor 10A during the secure communication connection event.

The first time period 80 is followed by a second time period 82, during which communications are performed between the portable device 20 and one or more of the other sensors 10B to 10F over the open advertising channels. As noted above, communication over the open advertising channels is not encrypted and does not use FHSS, DSSS, and/or OFDM. As shown in FIG. 9, during the second time period 82, sensors 40B to 40F transmit broadcast signals 40B to 40F, respectively, during the second time period 82. While five broadcast signals 40B to 40F are shown in the example of FIG. 9 for illustration, the sensors 10B to 10F can transmit any number of broadcast signals, depending on the length of the second time period 82, the total number of sensors 10 communicating over the open advertising channels, etc. As further shown in FIG. 9, the portable device 20 performs scanning/listening for the transmitted broadcast signals 40B to 40F during designated scanning/listening windows 42. Again, while five scanning/listening windows 42 are shown in FIG. 9, any number of scanning/listening windows 42 can be used, depending on the length of the second time period 82, the number of sensors 10 communicating over the open advertising channels, etc.

The timing for the communication between the portable device 20 and sensors 10B to 10F during the second time period 82 can be synchronized and coordinated by, for example, the PEPS control module 8 based on communication with the portable device 20 over the secure connection during the first time period 80. For example, sensor 10A can communicate with the portable device 20 over the secure connection and with the PEPS control module 8 over the vehicle interface 12. Once the portable device 20 and the PEPS control module 8 establish the timing for the communication over the open advertising channels, the PEPS control module 8 can inform sensors 10B to 10F of the timing so that the sensors 10B to 10F can synchronize the broadcast signals 40B to 40F with the respective scanning/listening windows 42 of the portable device 20. For example, the sensors 10B to 10F can transmit the broadcast signals 40B to 40F at predetermined intervals such as, for example 10 ms. The sensors 10B to 10F can inform the PEPS control module 8 of the timing for the first (or next) broadcast signal 44 via communication with the vehicle interface 12. The PEPS control module 8 can then communicate the timing information to sensor 10A to communicate to the portable device 20 over the secure communication connection during the first time period 80. In this way, the PEPS control module 8 can inform the portable device 20 of the time for the first (or next) broadcast signal and can inform the portable device 20 of the timing interval between broadcast signals such as, for example, 10 ms. The portable device 20 can then synchronize its scanning/listening windows 42 to bracket the anticipated time for the next broadcast signal. For example, if the next broadcast signal 40B is scheduled for a time of 10 ms, the corresponding scanning/listening windows 42 can start at 8 ms and continue until 12 ms to insure the scanning/listening window 42 is active when the broadcast signal 40B is transmitted.

The second time period 82 is followed by a third time period 84, during which the portable device 20 and sensor 10A return to communicating over the secure connection, as shown by block 43A-1.

In the example of FIG. 9, the portable device 20 can measure one or more aspects of the signals transmitted by the sensors 10. For example, the portable device 20 can measure aspects of the signals transmitted by sensor 10A during the secure connection communications, shown in blocks 43A-1. In addition, the portable device 20 can measure aspects of the broadcast signals 40B to 40F transmitted by the sensors 10B to 10F over the open communication channels. For example, the portable device can measure RSSI, angle of arrival, and/or time difference of arrival. The portable device 20 can then communicate the measured data, along with data included in the received signals and time stamps for the received signals to the PEPS system 1. For example, the portable device 20 can communicate data, time stamps, and the measured data to the PEPS control module 8 through communication with one or more of the sensors 10A to 10F. The sensors 10 can, for example, communicate the information to the PEPS control module 8 via communication over the vehicle interface 12. The PEPS control module 8 can then determine the location of the portable device based on the communicated information from the sensors 10.

Based on the determined location of the portable device 20, the PEPS system 1 can then authorize or perform a vehicle function, such as unlocking a door of the vehicle 5, unlocking a trunk of the vehicle 5, starting the vehicle, and/or allowing the vehicle to be started, based on the location of the portable device 20.

Figure 10:
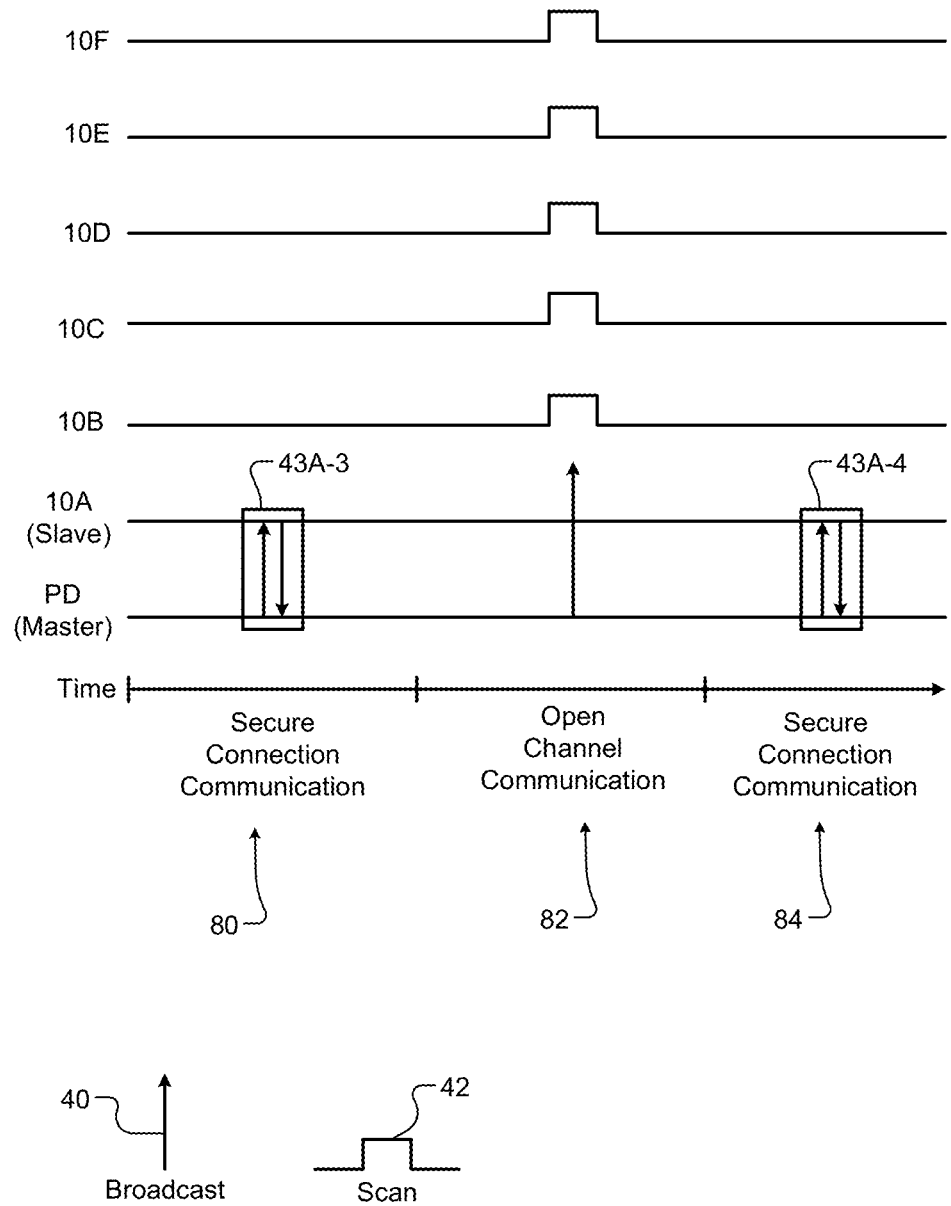
FIG. 10 illustrates another timing diagram for communication between a portable device and sensors according to another implementation of the present disclosure.

With reference to FIG. 10, a timing diagram is shown for another example implementation of a PEPS system 1 using a communication protocol with both open and secure connection channels, such as BLE, Wi-Fi, or Wi-Fi direct, and including communication packets being sent over both the open advertising channels and over secure communication connections 43A-3 and 43A-4. The example implementation of FIG. 10 is similar to the example implementation of FIG. 8 except that in the example implementation of FIG. 10 the portable device 20 serves as the master and sensor 10A serves as the slave during the secure connection communications shown by blocks 43A-3 and 43A-4. In all other respects, the example implementation of FIG. 10 operates the same as the example implementation of FIG. 8, the discussion of which is not repeated here.

Figure 11:
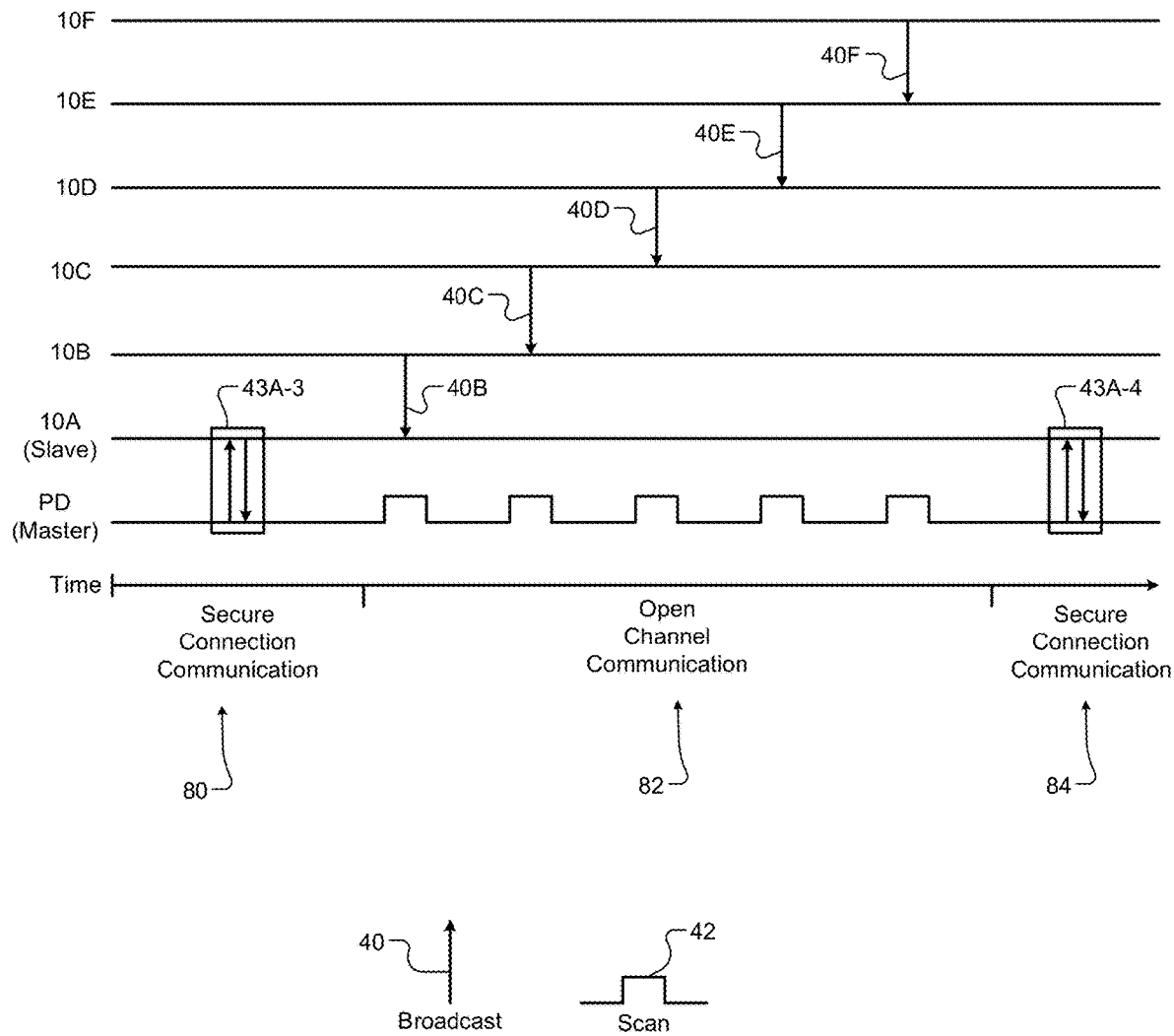
FIG. 11 illustrates another timing diagram for communication between a portable device and sensors according to another implementation of the present disclosure.

With reference to FIG. 11, a timing diagram is shown for another example implementation of a PEPS system 1 using a communication protocol with both open and secure connection channels, such as BLE, Wi-Fi, or Wi-Fi direct, and including communication packets being sent over both the open advertising channels and over secure communication connections 43A-3 and 43A-4. The example implementation of FIG. 11 is similar to the example implementation of FIG. 9 except that in the example implementation of FIG. 11 the portable device 20 serves as the master and sensor 10A serves as the slave during the secure connection communications shown by blocks 43. In all other respects, the example implementation of FIG. 11 operates the same as the example implementation of FIG. 9, the discussion of which is not repeated here.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

In this application, including the definitions below, the terms "module" and "system" may refer to, be part of, or include circuits or circuitry that may include processor hardware (shared, dedicated, or group) that executes code and memory hardware (shared, dedicated, or group) that stores code executed by the processor hardware. The code is configured to provide the features of the modules and systems described herein. In addition, in this application the terms "module" and "system" may be replaced with the term "circuit." The term "memory hardware" may be a subset of the term computer-readable medium. The term computer-readable medium does not encompass transitory electrical and electromagnetic signals propagating through a medium, and may therefore be considered tangible and non-transitory. Non-limiting examples of a non-transitory tangible computer readable medium include nonvolatile memory, volatile memory, magnetic storage, and optical storage.

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as JavaScript Object Notation (JSON), hypertext markup language (HTML) or extensible markup language (XML); (ii) assembly code; (iii) object code generated from source code by a compiler; (iv) source code for execution by an interpreter; (v) source code for compilation and execution by a just-in-time compiler, etc. As examples only, source code may be written using syntax from languages including C, C++, C #, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A system comprising:
a first sensor configured for wireless communication with a portable device using a communication protocol that allows for communication using a secure communication connection and at least one open advertising communication channel, the first sensor being configured to communicate with the portable device using the secure communication connection during a first time period and a third time period, the third time period being after the first time period;
a plurality of second sensors each configured to transmit broadcast signals to the portable device over the at least one open advertising communication channel during a second time period between the first time period and the third time period; and
a control module configured to (i) communicate with the first sensor and the plurality of second sensors, (ii)

determine, prior to the second time period, timing information for the plurality of second sensors to transmit the broadcast signals over the at least one open advertising communication channel during the second time period, (iii) communicate the timing information to the plurality of second sensors, the plurality of second sensors being configured to transmit the broadcast signals to the portable device over the at least one open advertising communication channel during the second time period based on the timing information, (iv) communicate the timing information to the portable device via the first sensor using the secure communication connection during the first time period, the portable device being configured to establish scanning windows for receiving the broadcast signals during the second time period based on the timing information, (v) receive first signal information about first signals transmitted by the first sensor over the secure communication connection during the first time period and second signal information about the broadcast signals transmitted by the plurality of second sensors during the second time period, the first signal information and the second signal information being communicated from the portable device to the control module over the secure communication connection during the third time period, and (vi) determine a current location of the portable device based on the first signal information and the second signal information;

wherein the first signal information and the second signal information include at least one of received signal strength indicator information, angle of arrival information, and time difference of arrival information.

2. The system of claim 1, wherein the first sensor and the plurality of second sensors are installed in a vehicle and the control module is further configured to perform a vehicle function including at least one of unlocking a door of the vehicle, unlocking a trunk of the vehicle, and allowing the vehicle to be started based on the current location of the portable device.

3. The system of claim 1, wherein the timing information includes a broadcast time for a next broadcast signal to be transmitted over the at least one open advertising communication channel during the second time period.

4. The system of claim 1, wherein the timing information further includes a timing interval between the broadcast signals to be transmitted over the at least one open advertising communication channel during the second time period.

5. The system of claim 1, wherein the first sensor is configured to communicate with the portable device using the secure communication connection by performing frequency hopping spread spectrum communication.

6. The system of claim 1, wherein the first sensor is configured to communicate with the portable device using the secure communication connection by at least one of sending and receiving encrypted communication packets.

7. The system of claim 1, wherein the first sensor is configured to communicate with the portable device using at least one of direct-sequence spread spectrum communication and orthogonal frequency-division multiplexing communication.

8. The system of claim 1, wherein the first sensor is configured to serve as a master and the portable device is configured to serve as a slave for the communication using the secure communication connection during the first time period and the third time period.

9. The system of claim 1, wherein the portable device is configured to serve as a master and the first sensor is configured to serve as a slave for the communication using the secure communication connection during the first time period and the third time period.

10. A method comprising:
performing, with a first sensor, wireless communication with a portable device using a communication protocol that allows for communication using a secure communication connection and at least one open advertising communication channel, the first sensor communicating with the portable device using the secure communication connection during a first time period and a third time period, the third time period being after the first time period;
determining, with a control module, timing information for a plurality of second sensors to transmit broadcast signals to the portable device over the at least one open advertising communication channel during a second time period between the first time period and the third time period, the control module being in communication with the first sensor and the plurality of second sensors;
communicating, with the control module, the timing information to the portable device via the first sensor using the secure communication connection during the first time period, the portable device establishing scanning windows for receiving the broadcast signals during the second time period based on the timing information;
communicating, with the control module, the timing information to the plurality of second sensors;
transmitting, with the plurality of second sensors, the broadcast signals to the portable device over the at least one open advertising communication channel during the second time period based on the timing information;
receiving, with the control module, first signal information about first signals transmitted by the first sensor over the secure communication connection during the first time period and second signal information about the broadcast signals transmitted by the plurality of second sensors during the second time period, the first signal information and the second signal information being communicated from the portable device to the control module over the secure communication connection during the third time period; and
determining, with the control module, a current location of the portable device based on the first signal information and the second signal information;
wherein the first signal information and the second signal information include at least one of received signal strength indicator information, angle of arrival information, and time difference of arrival information.

11. The method of claim 10, wherein the first sensor and the plurality of second sensors are installed in a vehicle, the method further comprising performing, with the control module, a vehicle function including at least one of unlocking a door of the vehicle, unlocking a trunk of the vehicle, and allowing the vehicle to be started based on the current location of the portable device.

12. The method of claim 10, wherein the timing information includes a broadcast time for a next broadcast signal to be transmitted over the at least one open advertising communication channel during the second time period.

13. The method of claim 10, wherein the timing information further includes a timing interval between the broadcast signals to be transmitted over the at least one open advertising communication channel during the second time period.

14. The method of claim 10, wherein the first sensor communicates with the portable device using the secure communication connection by performing frequency hopping spread spectrum communication.

15. The method of claim 10, wherein the first sensor communicates with the portable device using the secure communication connection by at least one of sending and receiving encrypted communication packets.

16. The method of claim 10, wherein the first sensor communicates with the portable device using at least one of direct-sequence spread spectrum communication and orthogonal frequency-division multiplexing communication.

17. The method of claim 10, wherein the first sensor serves as a master and the portable device serves as a slave for while communicating using the secure communication connection during the first time period and the third time period.

18. The method of claim 10, wherein the portable device serves as a master and the first sensor serves as a slave for while communicating using the secure communication connection during the first time period and the third time period.

19. A system comprising:
a control module configured for communication with a first sensor and a plurality of second sensors, the first sensor being configured for wireless communication with a portable device using a communication protocol that allows for communication using a secure communication connection and at least one open advertising communication channel, the first sensor also being configured to communicate with the portable device using the secure communication connection during a first time period and a third time period, the third time period being after the first time period, and the plurality of second sensors each being configured to transmit broadcast signals to the portable device over the at least one open advertising communication channel during a second time period between the first time period and the third time period;

wherein the control module is configured to (i) determine, prior to the second time period, timing information for the plurality of second sensors to transmit the broadcast signals over the at least one open advertising communication channel during the second time period, (ii) communicate the timing information to the plurality of second sensors, the plurality of second sensors being configured to transmit the broadcast signals to the portable device over the at least one open advertising communication channel during the second time period based on the timing information, (iii) communicate the timing information to the portable device via the first sensor using the secure communication connection during the first time period, the portable device being configured to establish scanning windows for receiving the broadcast signals during the second time period based on the timing information, (iv) receive first signal information about first signals transmitted by the first sensor over the secure communication connection during the first time period and second signal information about the broadcast signals transmitted by the plurality of second sensors during the second time period, the first signal information and the second signal information being communicated from the portable device to the control module over the secure communication connection during the third time period, and (v) determine a current location of the portable device based on the first signal information and the second signal information; and wherein the first signal information and the second signal information include at least one of received signal strength indicator information, angle of arrival information, and time difference of arrival information.

20. The system of claim 19, wherein the first sensor and the plurality of second sensors are configured for installation in a vehicle and the control module is further configured to perform a vehicle function including at least one of unlocking a door of the vehicle, unlocking a trunk of the vehicle, and allowing the vehicle to be started based on the current location of the portable device.

* * * * *